United States Patent [19]

Bruekheimer

[11] Patent Number: 5,367,544
[45] Date of Patent: Nov. 22, 1994

US005367544A

[54] DATA STREAM FRAME SYNCHRONISATION

[75] Inventor: Simon D. Bruekheimer, London, Great Britain

[73] Assignee: Northern Telecom Limited, Montreal, Canada

[21] Appl. No.: 147,691

[22] Filed: Nov. 4, 1993

Related U.S. Application Data

[63] Continuation-in-part of Ser. No. 116,949, Sep. 7, 1993, abandoned, which is a continuation of Ser. No. 29,986, Mar. 12, 1993, abandoned, which is a continuation of Ser. No. 517,254, May 1, 1990, abandoned.

[30] Foreign Application Priority Data

May 4, 1989 [GB] United Kingdom ............... 8910255

[51] Int. Cl.$^5$ ............................................. H04L 7/00
[52] U.S. Cl. ..................................... 375/116; 371/42; 371/46
[58] Field of Search ............................ 375/114, 116; 370/105.4, 106; 371/47.1, 37.1, 46, 42

[56] References Cited

U.S. PATENT DOCUMENTS

| | | | |
|---|---|---|---|
| 3,801,956 | 4/1974 | Braun et al. | 375/116 X |
| 3,855,576 | 12/1974 | Braun et al. | 375/116 X |
| 3,873,920 | 3/1975 | Apple, Jr. et al. | 371/47.1 X |
| 4,316,285 | 2/1982 | Bobilin et al. | 375/116 |
| 4,959,834 | 9/1990 | Aikawa et al. | 371/47.1 |

OTHER PUBLICATIONS

"Error Control Coding Fundamentals and Applications" Daniel J. Costello, Jr. and Shulin, Prentice-Hall, Inc., 1983, pp. 51–57 and 85–110.

*Primary Examiner*—Tesfaldet Bocure
*Attorney, Agent, or Firm*—Lee, Mann, Smith, McWilliams, Sweeney & Ohlson

[57] ABSTRACT

A data stream has frames of fixed, or variable but determined, length and includes a fixed length header at a predetermined position in the frame, which header has a linear systematic code structure including information digits and check digits. The check digits are employed for frame synchronization detection, as well as error detection and correction, using, for example, a modified CRC (cyclic redundancy check) decoder.

16 Claims, 3 Drawing Sheets

DATA STREAM FRAME SYNCHRONISATION

RELATED APPLICATIONS

This application is a continuation-in-part of U.S. patent application Ser. No. 116,949, filed Sep. 7, 1993, abandoned, which is a continuation of U.S. patent application Ser. No. 029,986, filed Mar. 12, 1993, abandoned, which is a continuation of U.S. patent application Ser. No. 517,254, filed May 1, 1990, abandoned.

BACKGROUND OF THE INVENTION

This invention relates to data stream frame synchronisation detection and apparatus therefor.

SUMMARY OF THE INVENTION

According to one aspect of the present invention there is provided a method of detecting frame synchronisation of a data stream, which frames are of fixed length or of a variable but determined length indicated by a pattern or by information in the data stream, which frames include a fixed length header at a predetermined position in each frame, which header has a linear systematic code structure including information digits and check digits, and wherein the check digits are employed for frame synchronisation detection without compromising their possible use for error detection in and correction of the header.

According to another aspect of the present invention there is provided an apparatus for detecting frame synchronisation of a data stream, which frames are of fixed length or of a variable but determined length indicated by a pattern or by information in the data stream, which frames include a fixed length header at a predetermined position in each frame, which header has a linear systematic code structure including information digits and check digits, which check digits were derived from a polynomial representative of the information digits of the header, which polynomial has coefficients valid over a Galois field, by their polynomial division by a code generator polynomial whose coefficients are defined over a Galois field, the apparatus including means whereby a first incoming code word is divided by the code generator polynomial, means whereby a subsequent incoming code word is divided by the code generator polynomial, means whereby any remainder of the first division is compared with any remainder of the subsequent division, the presence of a predetermined relationship therebetween indicating that the subsequent incoming code word is valid, and means for correlating and indicating frame synchronisation in response to receipt of a succession of valid code words once every predetermined frame length for a predetermined number of frames.

BRIEF DESCRIPTION OF THE DRAWINGS

Embodiments of the invention will now be described with reference to the accompanying drawings, in which.

DESCRIPTION OF THE PREFERRED EMBODIMENTS

Figure 4:
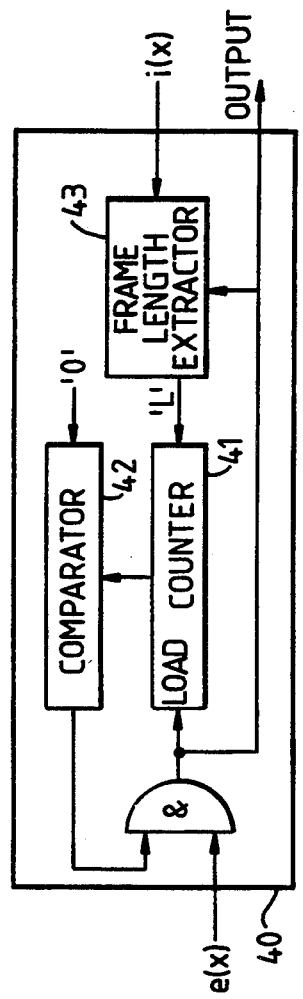
FIG. 4 illustrates schematically an embodiment of correlator for use in the receiver of the transmission system illustrated in FIG. 1.

The data streams with which the invention is concerned have data structured into fixed length frames or arbitrary sized frames, when there is some indication of the current frame length—either predetermined, or derived from the data stream. The frames include a fixed length header at a predefined position in the frame. The header has a linear systematic code structure.

Thus, formally, for example, a particular binary data stream may be considered to have the following structure:

(1) At the topmost level, the binary data form a frame of fixed length in bits L, and occurs every period of L bits, i.e. frames transmitted on the data bit stream are contiguous.

(2) The frame comprises a header and a body portion, the header being of length in bits n, where $n \leq L$, and the body being of length in bits j, where $j \leq L - n$.

(3) The header begins at an arbitrary, but fixed, offset in bits u, from the frame boundary, where $0 \leq u \leq L - n$.

(4) The header is a linear systematic code, i.e. the first k bits comprises the information, the latter $r = n - k$ bits being the parity check bits, forming an (n, k) code structure. The parity check bits encode the information bits into the linear systematic code, and protect the header bits of the frame alone against error.

(5) The r parity check bits provide the ability to detect and possibly correct additive errors in the channel on which the binary data stream has been transmitted.

Since the header is at a fixed position in the frame, it will also have a periodicity of L. If $n = L$, the header is of the same length as the frame, and headers appear contiguously on the binary data stream. If $n < L$, then there are $L - n$ arbitrary bits of a frame body between successive headers.

It is proposed that the linear systematic code parity check bits be used for the purpose of frame synchronisation at the receiver by virtue of their mathematical relationship with the information bits of the header. This facility is at no detriment to the additive error detection and correction capabilities of the code.

The applicable set of linear systematic codes are those whose parity check bits are derived from the polynomial representation of the k information bits by their division by a code generator polynomial g(x). For example, this applies to cyclic codes and Bose Chaudhuri Hocquenghem codes. The linear systematic may, for example be a pure (natural length) or a shortened cyclic code. The conventional hardware mechanism that performs polynomial division is a clocked shift register with feedback applied to correspond to coefficients of the terms in the generator polynomial g(x). By adapting the decoding mechanism it is possible to devise decoder hardware to perform the necessary frame synchronisation. Once frame synchronisation is obtained the decoder may assume its conventional role of error detection and correction, as well as now indicating possible synchronisation loss or slip.

A conventional CRC (cyclic redundancy check) decoder can be realised by a shift register and linear feedback obtained via exclusive-or operations (modulo 2 summation). Such a decoder performs division of the incoming code word i(x) by the code generator polynomial g(x). The register is preset to all zero and the shift register contents are shifted by one position for each incoming bit of the code word. After n such shifts a remainder of zero indicates a valid code word and the absence of all error.

For example, in a decoder configuration where the code word is fed into the shift register from the left, normally the shift register must be reset to all zero before the remainder calculation is performed. If it is not reset, after n shifts it contains a remainder corresponding to having divided the code word of interest and the bits preceding the code word, the old contents of the register, by the generator polynomial. It can be shown mathematically that if the next n bits form a valid code word with the generator polynomial as its factor, then after their division an identical remainder will remain in the shift register to that contained prior to the shift operation for a pure code word, or would have a fixed mathematical relationship to that contained prior to the shift operation for a shortened code. Since the code word is completely divisable by the generator polynomial, there has been no additive effect on the original remainder after shifting in the code word. By comparing the remainders just prior to and just after shifting in any n bit sequence, if these remainders are equal or have a fixed mathematical relationship for a shortened code then the n bits form a valid code word. The true remainder of an errored code word can be obtained by the modulo 2 sum of these remainders, thus allowing normal error detection and possible further correction as well as frame synchronisation. There now follows a mathematical proof that there is no effect on the ability of a linear systematic code decoder circuit to detect valid or errored code words, if it has not been reset prior to this operation.

Let i(x) be any valid code word of the linear systematic code.

Let g(x) be the generator polynomial for that code.

Figure 1:
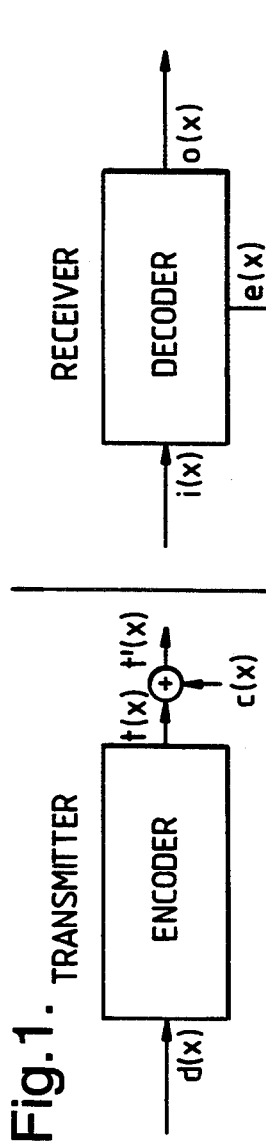
FIG. 1 illustrates a basic transmission system with frame synchronisation.

At the encoder which is at the transmitter as indicated in FIG. 1, d(x) is the polynomial representation of the data sequence of k information bits, that is made into a code word, i(x) of length n, (transmitted to the receiver and received at the decoder) such that, $$i(x) = x^{n-k}d(x) \oplus r(x)$$

where, $$x^{n-k}d(x) = q(x)g(x) \oplus r(x)$$

and d(x) is of degree $k-1$ or less, r(x), the remainder, is of degree $n-k-1$ or less, and i(x) is of degree $n-1$ or less, and q(x) is the quotient.

Polynomial g(x) must be chosen to be a factor or primitive polynomial of the polynomial expression $x^n \oplus 1$. This will guarantee a Hamming distance greater than 2, and ensures optimum error performance from the code. Therefore, $$x^n \oplus 1 = h(x)g(x),$$

where h(x) is the parity check polynomial for the code, of degree k. For g(x) to be a primitive polynomial of $x^n \oplus 1$, $$\sim \exists m : x^m \oplus 1 = f(x)g(x), \forall m < n$$

In the case of a valid code word and assuming the decoder contains some residual remainder polynomial s(x) at an arbitrary moment in time, such that i(x) is the next data sequence to be shifted in, then the remainder s(x) is equivalent to an additive polynomial shifted by n places, or multiplied by $x^n$, i.e.

$$i'(x) = x^n s(x) \oplus i(x)$$

is the newly formed code word on which the decoder will operate. The division process yields the following result, $$\begin{aligned} i'(x) &= x^n s(x) \oplus i(x) \\ &= x^n s(x) \oplus q(x)g(x) \end{aligned}$$

where q(x) is some quotient of degree $k-1$ or less, $$= (x^n \oplus 1)s(x) \oplus s(x) \oplus q(x)g(x)$$

due to using modulo 2 addition, $$= [h(x)s(x) \oplus q(x)]g(x) \oplus s(x)$$

where s(x) is of degree $n-k-1$ or less, $$= q'(x)g(x) \oplus s(x)$$

where q'(x) is of degree $k-1$ or less and s(x) is the original remainder. Remainder s(x) will be the result left in the decoder register, which has been unchanged by having shifted in a valid code word i(x). In the case of a residual remainder and an errored code word, let e(x) be some additive error polynomial introduced into the channel between the transmitter and the receiver, such that, $$i'(x) = i(x) \oplus e(x)$$

Ordinarily at the decoder, $$\begin{aligned} i'(x) &= q(x)g(x) \oplus e_q(x)g(x) \oplus e_r(x) \\ &= q'(x)g(x) \oplus e_r(x) \end{aligned}$$

where $q'(x) = q(x) \oplus e_q(x)$, the quotient part of the errored code word of degree $k-1$ or less, and $e_r(x)$ is the remainder, of degree $n-k-1$ or less.

Again assume some remainder s(x) is in the decoder register just as i'(x), the errored code word, is the data sequence about to be shifted in. As before, $$i''(x) = x^n s(x) \oplus i'(x)$$

Dividing by the generator polynomial, g(x), $$\begin{aligned}
i''(x) &= x^n s(x) \oplus q'(x)g(x) \oplus e_r(x) \\
&= (x^n \oplus 1)s(x) \oplus s(x) \oplus q'(x)g(x) \oplus e_r(x) \\
&= [h(x)s(x) \oplus q'(x)]g(x) \oplus s(x) \oplus e_r(x) \\
&= q''(x)g(x) \oplus s'(x)
\end{aligned}$$

where, $$s'(x) = s(x) \oplus e_r(x)$$

the new remainder of degree $n-k-1$ or less. Thus the syndrome $e_r(x)$ of the errored code word may be retrieved by summing the old and new remainders, $$e_r(x) = s(x) \oplus s'(x)$$

and in the presence of a detectable error, $e_r(x) \neq 0$.

Since $e_r(x) \equiv 0$, in the absence of all error, or for an undetectable additive error, synchronisation of the decoder with the incoming valid code words, may be achieved by continually performing the above summation.

The probability that an arbitrary data sequence is a valid code word when using in an (n,k) linear systematic code, is $2^{-r}$, where $r = n-k$, since there are $2^k$ valid code words in $2^n$ possibilities. For modest r, this probability is small.

Figure 2:
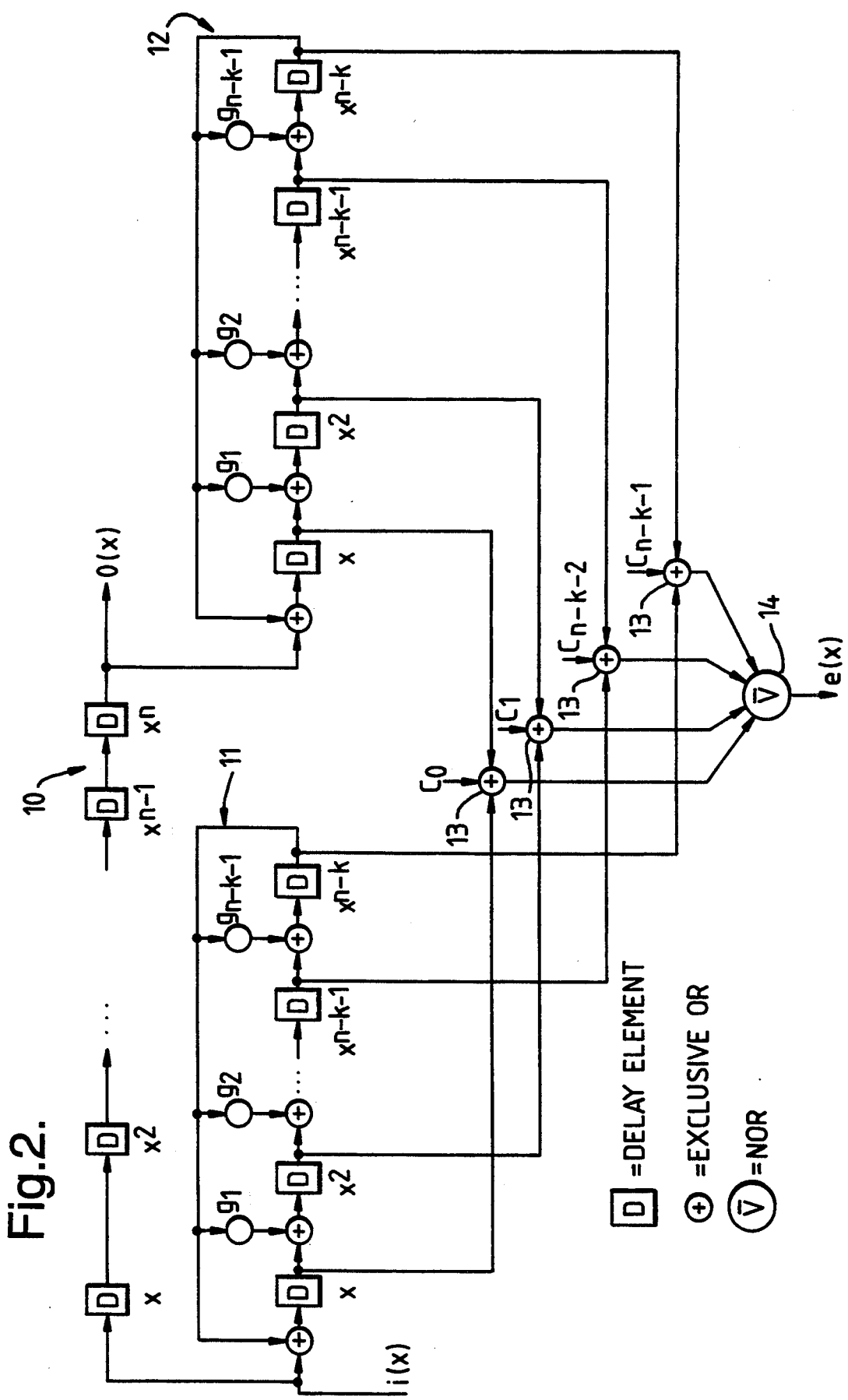
FIG. 2 illustrates schematically a modified CRC decoder according to the present invention for natural length cyclic codes.

An example of a hardware mechanism that performs the function of continuously monitoring the incoming binary data stream for valid code words is shown in FIG. 2 of the accompanying drawings. It can be regarded as a modified CRC decoder.

In the initial condition, all delay elements D are reset to contain zero, and need never again be reset. The binary data stream i(x) enters at the left. The point o(x) is the same information stream as i(x), but delayed by n bit periods, where n is the length of the pure code word. The point e(x) is a binary data stream that contains a binary 1 digit whenever a valid code word in stream i(x) has been detected; the first bit of the valid code word is available in delay element $x^n$.

The circuit comprises two decoders 11, 12, one (11) operating on the i(x) stream and the other (12) on the o(x) stream. The decoders continuously divide the incoming data by the code's generator polynomial. The circles labelled $g_i$, ($1 \leq i \leq n-k-1$) are the coefficients of the generator polynomial g(x), being either a 1, corresponding to a connection, or 0, an open circuit. The second decoder 12 receives the incoming data delayed by n bit periods by delay line 10 and faithfully reproduces the remainders of the first decoder 11 for each bit shifted in. All delay elements are clock synchronously.

The contents of the two decoders are compared at each bit shift by an r bit wide comparator formed by separate exclusive-or elements 13 and a multi-input logical nor function 14.

The binary data stream e(x) is used to perform the frame synchronisation. There is a $2^{-r}$ chance that an arbitrary n bit sequence of i(x) will form a valid code word. Thus e(x) may be 1 at times other than the detection of a frame header. (This is no different to data imitating a frame synchronisation sequence in a conventional approach). A valid 1 in the e(x) stream is defined to be repeated every L bits i.e. once every frame length, for fixed length frames. Alternatively on detecting a valid code word, any length information of that delineated frame may be used to predict and thereby correlate the position of the next frame.

Any method of frame synchronisation applicable to the detection of conventional frame synchronisation patterns may be used. Those skilled in the art will appreciate that any frame correlation technique for fixed or variable frame lengths may be employed on the output stream e(x) for determining frame synchronisation. Specifically, for fixed length frames, the output e(x) can be applied to a correlator 40 (FIG. 4) comprising a reset counter 41 a comparator 42 and a frame length extractor 43 to detect occurrences of valid code words every L bits. These correspond to the frame header positions with increasing probability, as successive valid code word occurrences are detected. The frame length extractor 43 extracts the length of the current frame from the i(x) stream in the case of variable length frames, the length information being made available at the time of the next indication of a valid code word, that is a "1" in e(x) as will be apparent from the following. No frame length extractor is required for fixed length frames. The correlator operates by outputting a binary "1" whenever an occurrence is detected (e(x) is a "1"), if the counter contains a count of "0".

Initially the counter is zeroed. The first occurrence (e(x) is "1") causes the counter to load the value "L" and start counting down, and the correlator outputs a "1". All possible code word occurrences between counters of "L" and "1" are ignored by the comparator. When the counter reaches the end count of "0", one of two things may happen:
 (i) A "1" in e(x) causes the correlator to output another "1", loads the counter with the value "L" and begins countings down; this process potentially repeating at the next occurrence and so on.
 (ii) If there is no "1" in e(x), there is no output of the correlator ("0"), and the counter steps counting, i.e. it is back in the initial state of "0".

Spurious outputs are thereby filtered by the counter not containing "0" when the next valid code word occurrence is detected, or if the counter contains "0" and no occurrence is detected. If the occurrences occurrences every L bits are repeated for some predefined number (m) of successive frames, synchronisation is achieved. If not periodic, the occurrence of a valid code word is a spurious output and a new position is searched by awaiting the next occurrence of a valid code word, irrespective of its position. Once header synchronisation is achieved, the frame start is at an offset u from this point. FIG. 1 schematically illustrates frame synchronisation.

A problem that occurs with cyclic codes is synchronisation resolution. Any cyclic shift of a cyclic code word is another valid code word. When just one bit period out of the true synchronisation position, there is a 50% probability (in the ideal case) that the missing bit will be imitated correctly by a bit adjacent to the header code word. However, by using a coset of the cyclic code, which does not contain the all zero code word, this resolution problem can be virtually eliminated.

In the transmitter encoder, the coset is formed by adding a known non-zero (non-trivial) polynomial c(x) to the transmitted code, i.e. to all valid code words before transmission. The added polynomial results in an error in the detector when a cyclic shift of the code word is decoded, reducing the probability of code word imitation by adjacent bit positions or small bit slips.

The coset polynomial c(x) can always be arranged to be of degree $n-k-1$ or less. Using a similar analysis to before and since c(x) is indivisible by the generator polynomial g(x), the final result at the decoder will be, $$i'(x) = q''(x)g(x) \oplus s(x) + e_r(x) \oplus c(x)$$
$$= q''(x)g(x) \oplus s'(x)$$

where;
$$s'(x) = s(x) \oplus e_r(x) \oplus c(x)$$

The syndrome $e_r(x)$ of an error word, can be retrieved by the summation of the coset polynomial and the old remainder, with the new remainder, thus, $$e_r(x) = s'(x) \oplus s(x) \oplus c(x)$$

and in the presence of a detectable error, $e_r(x) \neq 0$.

The proposed detector can decode a coset code too, by introducing the coset polynomial's coefficients $c_i$, $(0 \leq i \leq n-k-1)$ at the comparator (exclusive-or elements 13). This is always possible since a coset of the code can always be arranged such that it is formed by the addition of a polynomial c(x) of a degree less than $(n-k-1)$ to the lowest order bits of the code word, i.e. not divisible by the generator polynomial g(x). If the two remainders differ by the coset polynomial c(x), then a valid code word has just been detected.

In the above there is thus described use of a decoder for a linear systematic code to provide a further function of a detection of a frame synchronisation pattern on a transmitted binary data stream. The decoder may be used for frame synchronisation acquisition and synchronisation error detection. The feature of the decoder that allows it to be used for this purpose, is the removal of the need to reset the decoder between code words and therefore the ability to continuously monitor the received binary data stream. This makes a fast and space efficient solution.

Frame synchronisation of a binary data stream is thus achieved using CRC encoded headers. A modified CRC detector is used to detect headers of frames on a binary data stream and the frame synchronisation at the receiver is performed without requiring further redundancy or synchronisation patterns.

FIG. 2 depicts an arrangement suitable for those cyclic code structures where the generator polynomial g(x) is a primitive polynomial of $x^n+1$. In a shortened cyclic code, the length $n_s = n-1$ of the code word is shorter than the cyclic code for which the chosen g(x) is a generator polynomial, by l bits. The shortened cyclic code is no longer truly cyclic, since it forms a sub-code of the cyclic code and all code words are preceded by l zeroed bits, which are not transmitted.

Figure 3:
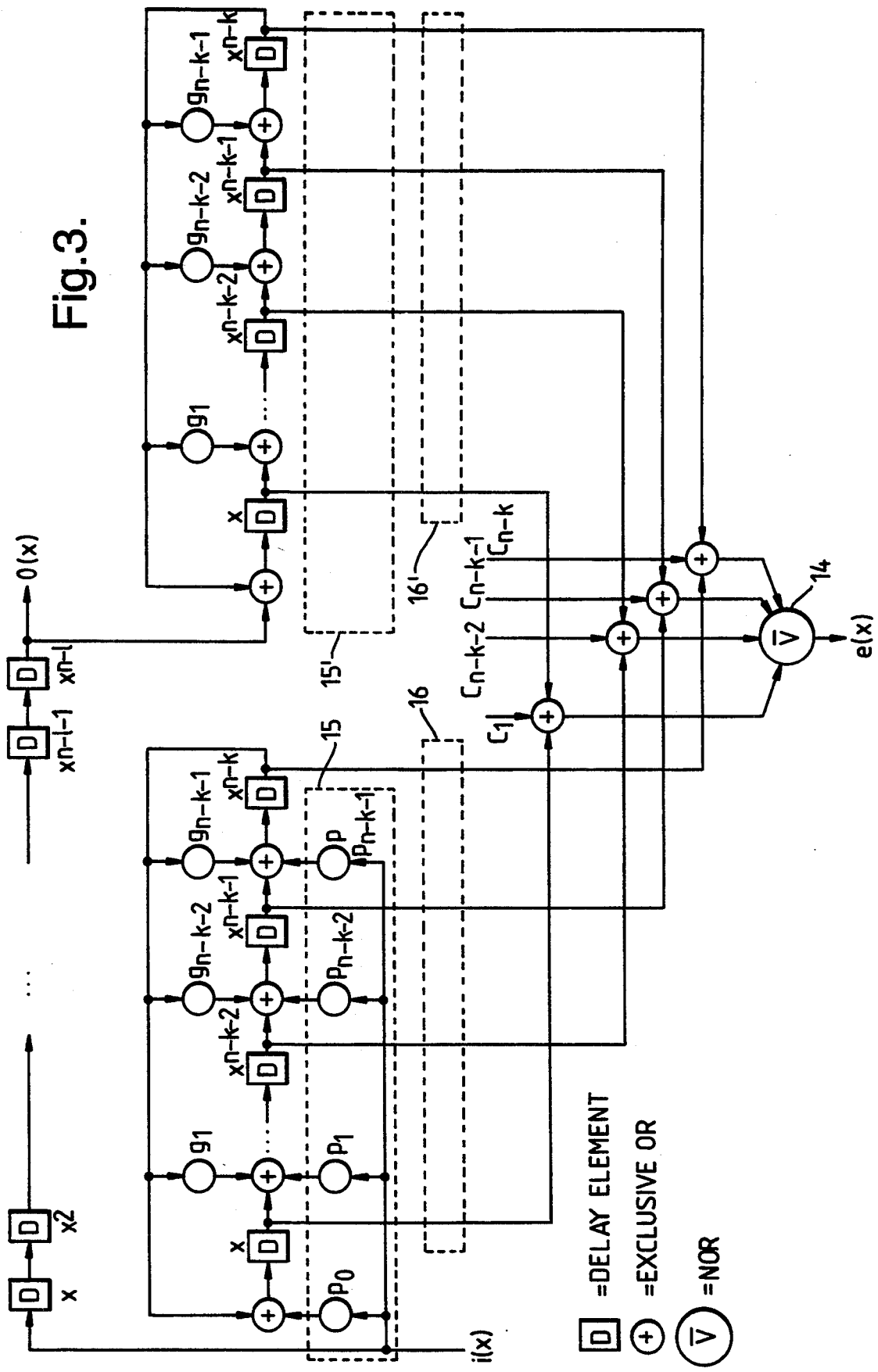
FIG. 3 illustrates schematically a modified CRC decoder according to the present invention for shortened cyclic codes.

The specific hardware may be modified to operate on shortened cyclic code structures in the following way and as indicated in FIG. 3. The delay line must be reduced in length by $\iota$ stages to length $n_s$, so that it reflects the length of the shortened code words. The code word formed by not resetting the decoders is now:

$$i'(x) = x^{n-l}s(x) \oplus i(x)$$
$$= x^{n-l}s(x) \oplus q(x)g(x)$$
$$= x^{-l}(x^n \oplus 1)s(x) \oplus x^{-l}s(x) \oplus q(x)g(x)$$
$$= [x^{-l}h(x)s(x) \oplus q(x)]g(x) \oplus x^{-l}s(x)$$
$$= q'(x)g(x) \oplus S'(x)$$

i.e. since g(x) is not a factor of $x^\iota$ for $\iota < n$, a new remainder is formed that is nl shifts of the previous reminder. Hence the two decoders will now be out of step by l shifts. If i(x) is a valid code word, then the original remainder s(x) is mathematically reproduced by autonomous clocking of the decoder a further l times, since there are conceptually l zeros following the code word. The autonomous clocking can be achieved (i) by pre-multiplication of all information entering either one of the two decoders by a polynomial determined as follows:

The polynomial representation of the data:

$$x^\iota i(x) = q_1(x)g(x) \oplus s^{(\iota)}(x)$$

where $s^{(\iota)}(x)$ is the remainder resulting from the division of $x^\iota i(x)$ by g(x), and $x^\iota i(x)$ represents a codeword shortened by bits, which is equivalent to pre-multiplication by $x^\iota$.

Let p(x), the pre-multiplication polynomial, be the remainder of dividing $x^\iota$ by g(x). Therefore:

$$p(x) = x^\iota \oplus q_2(x)g(x)$$

Hence, pre-multiplying i(x) by p(x) yields:

$$p(x)i(x) = x^\iota i(x) \oplus q_2(x)g(x)$$
$$= q_1(x)g(x) \oplus s^{(\iota)}(x) \oplus q_2(x)g(x)$$
$$= q'(x)g(x) \oplus s^{(\iota)}(x)$$

which is equivalent to $\iota$ shifts of the decoder, since it leaves the same remainder as above. Thus the disparity of $\iota$ shifts between the remainders in the two decoders may be cancelled by a pre-multiplication polynomial. This would be equivalent either to multiplying information into the first decoder by $x^\iota$, or information into the second decoder by $x^{-\iota}$. The alternatives are shown by dotted boxes 15 and 15' in FIG. 3.

Pre-multiplication of the information into the first decoder also has the advantage of allowing the syndrome in this decoder to be used for error correction directly, once frame synchronisation of the channel is achieved.

(ii) by post-multiplication of the remainders in one of the two decoders by a matrix determined as follows:

The division by g(x) is equivalent to a matrix multiplication of the contents of the decoder for each shift of the register. Thus $\iota$ such shifts is equivalent to multiplying by this matrix raised to the power $\iota$, reproducing s(x) from $x^{-\iota}s(x)$ or $s^{-\iota}(x)$ in a single clock cycle. The non-zero elements of each column of this matrix can be realised in hardware as an exclusive-or of the corresponding stages in the decoder register, to produce each bit of the remainder. Thus this matrix can be realised as a linear operation on the contents of the first decoder indicated by dashed box 16 (or its inverse 16' on the second decoder) just prior to the comparator.

Although a serial implementation is referred to above, the method of non-resetting the CRC syndrome applies equally to a parallel implementation, of arbitrary parallel symbol width. Matrix operations would need to be performed on a symbol in one symbol lifetime. Other serial decoder implementations are also equally applicable as will be appreciated by those skilled in the art.

In the above, specific mention is made of a binary data stream. The invention is, however, not so restricted as will be appreciated by those skilled in the art. The header has a linear systematic code structure including information bits and check bits and in the general case the check bits (digits) are derived from a polynomial representative of the information bits (digits) of the header, which polynomial is required to have coefficients valid over a Galois field, by their polynomial division by a code generator polynomial whose coefficients are defined over a Galois field. In the general case, the "modulo-2" operations would be "modulo-Q" operations, where Q represents a valid coefficient of the code generator polynomial.

I claim:

1. A method of detecting frame synchronisation of a data stream, which frames are of fixed length or of a variable but determinable length indicated by a pattern or by information in the data stream, which Said frames include a fixed length header at a predetermined position in each frame, which said header has a linear systematic code structure including information symbols and check symbols, which said check symbols are derived from a polynomial representative of the information symbols of the header, which said polynomial has coefficients valid over a Galois field, by their polynomial division by a code generator polynomial whose coefficients are defined over a Galois field, and wherein the check symbols are employed for frame synchronisation detection without compromising their possible use for error detection in and correction of the header, the method of detection comprising the steps of dividing an incoming data stream by the code generator polynomial, simultaneously dividing a preceding but delayed incoming data stream by the code generator polynomial, comparing any remainder of the first mentioned division with any remainder of the second mentioned simultaneous division, the presence of identical remainders indicating that the incoming data stream is a valid code word, and determining the occurrence of a succession of said valid code word once every frame length for a predetermined number of frames, which said occurrence indicates frame synchronisation, and also including determining the frame length from the data stream if the frames are of said variable but determinable length.

2. A method as claimed in claim 1 wherein each division is carried out in a respective decoder including a respective shift register and wherein the shift registers are not preset preceding all divisions, other than in the initial condition.

3. A method as claimed in claim 1 wherein the division steps are carried out in parallel by means of parallely disposed division means.

4. A method as claimed in claim 1 and wherein the incoming data stream is continuously monitored at all symbol positions.

5. A method as claimed in claim 1 and wherein the syndrome of an errored code word is obtained by modulo-Q addition (where Q represents the number of valid coefficients of the code generator polynomial) of the remainders of the first and second mentioned divisions, which syndrome is used for error correction.

6. A method as claimed in claim 1 wherein said data stream is transmitted from a transmitter to a receiver at which latter said frame synchronisation detection is performed, including a step of adding at the transmitter a non-trivial coset polynomial to the code to be transmitted, which said added polynomial results in an error in cyclically shifted code words, in an error when symbol by symbol monitoring is not at the true code word position, and in symbol slips and gains from the true code word position, and wherein a difference between said remainders, equal to a coset polynomial indicates detection of a valid code word, a succession of valid code words once every frame length for a predetermined number of frames indicating frame synchronisation.

7. A method as claimed in claim 1 wherein the header code structure is a pure or shortened cyclic code.

8. An apparatus for detecting frame synchronisation of a data stream, which frames are of a fixed length or of a variable but determinable length indicated by a pattern or by information in the data stream, which said frames include a fixed length header at a predetermined position in each frame, which said header has a linear systematic code structure including information symbols and check symbols, which said check symbols were derived from a polynomial representative of the information symbols of the header, which said polynomial has coefficients valid over a Galois field, by their polynomial division by a code generator polynomial whose coefficients are defined over a Galois field, the apparatus including means which divide an incoming data stream by the code generator polynomial, means which simultaneously divide a preceding but delayed incoming data stream by the code generator polynomial, means which compare any remainder of the first mentioned division with any remainder of the second mentioned division, the presence of a predetermined relationship between the remainders corresponding to the said incoming data stream being a valid code word, and means which correlate valid code word positions and indicate frame synchronisation in response to receipt of a succession of said valid code word once every frame length for a predetermined number of frames, and also including means in response to said valid code word, which determine the frame length from the data stream if the frames are of said variable but determinable length.

9. Apparatus as claimed in claim 8 wherein the predetermined relationship requires the remainders to be identical.

10. Apparatus as claimed in claim 8 and for use with a data stream transmitted from a transmitter to a receiver at which latter the said frame synchronisation detection is performed, and including means at the transmitter for adding a non-trivial coset polynomial to the code to be transmitted, which added polynomial results in an error in cyclically shifted code words, in an error when symbol by symbol monitoring is not at the true code word position, and in symbol slips and gains from the true code word position, and wherein the predetermined relationship requires the remainders to differ by the coset polynomial.

11. Apparatus as claimed in claim 8 and wherein the dividing means for performing the division of said incoming data stream by the code generator polynomial comprises first decoder means, and the dividing means for performing the division of the preceding but delayed incoming data stream by the code generator polynomial comprises second decoder means, delay line means being coupled between the inputs of the first and second decoder means.

12. Apparatus as claimed in claim 8 wherein the first mentioned and second mentioned division means are disposed in parallel.

13. Apparatus as claimed in claim 10 and wherein the dividing means for performing the division of said incoming data stream by the code generator polynomial comprises first decoder means, and the dividing means for performing the division of the preceding but delayed incoming data stream by the code generator polynomial comprises second decoder means, delay line means being coupled between inputs of the first and second decoder means and including means for applying the coset polynomial coefficients to the comparator means.

14. Apparatus as claimed in claim 11 wherein the first decoder means comprises a first shift register employing linear feedback by exclusive-or operations, the said incoming data stream being applied to the first shift register via an input thereof comprising the input of the first decoder means, wherein the second decoder means comprises a second shift register employing linear feedback by exclusive-or operations, the preceding but delayed incoming data stream being applied to the input of the second shift register via an input thereof comprising the input of the second decoder means, the first shift register having the same number of stages as the second shift register, wherein the output of each stage of the first shift register is applied to a respective exclusive-or element, the output of each stage of the second shift register is applied to a corresponding one of said exclusive-or elements whereby to compare said outputs, and wherein the outputs of said exclusive-or elements are applied to a multi-input logical nor element which has a non-zero output only when there is a said valid code word.

15. Apparatus as claimed in claim 14 and including a linear operator apparatus disposed between one of said first and second decoder means and the exclusive-or elements, whereby the remainder associated with the said one of said first and second decoder means is applied to the linear operator apparatus prior to comparison with the remainder associated with the other one of said first and second decoder means whereby to detect a code word of a shortened cyclic code format.

16. Apparatus as claimed in claim 14 and including means for pre-multiplying the data stream applied to one of said first and second decoder means by a further polynomial having coefficients valid over a Galois field and such as to allow detection of a code word of a shortened cyclic code format.

* * * * *

UNITED STATES PATENT AND TRADEMARK OFFICE
CERTIFICATE OF CORRECTION

| | | |
|---|---|---|
| PATENT NO. | : 5,367,544 | Page 1 of 1 |
| APPLICATION NO. | : 08/147691 | |
| DATED | : November 22, 1994 | |
| INVENTOR(S) | : Simon Daniel Brueckheimer | |

It is certified that error appears in the above-identified patent and that said Letters Patent is hereby corrected as shown below:

On the Title Page, Item (75)
The surname of the inventor is misspelled. It should be Brueckheimer.

Signed and Sealed this

Twenty-second Day of May, 2007

JON W. DUDAS
*Director of the United States Patent and Trademark Office*